Dec. 16, 1969     C. A. ERICKSON     3,484,829
STANDING FIXTURE FOR BICYCLE PASSENGER
Filed March 21, 1968
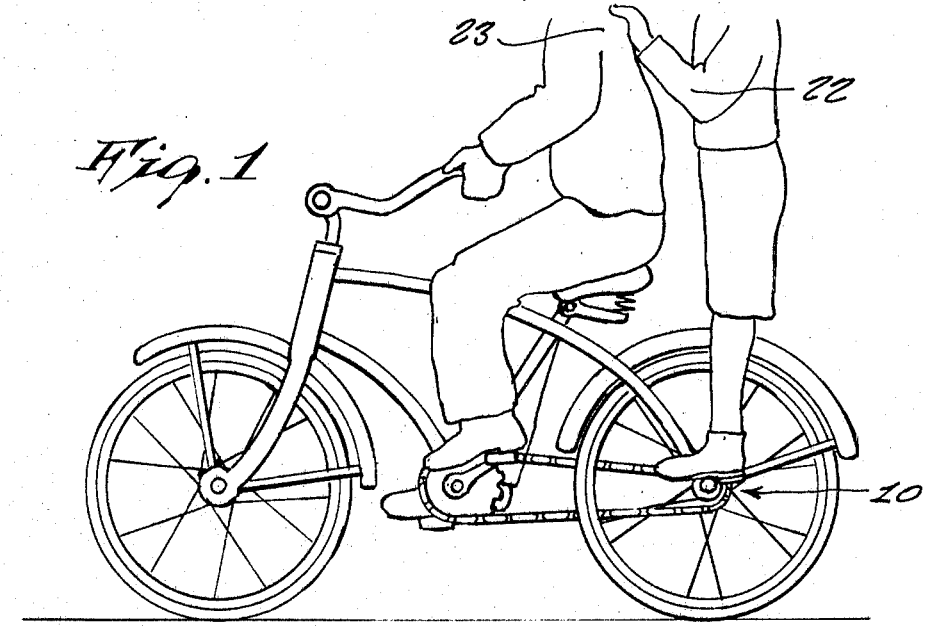
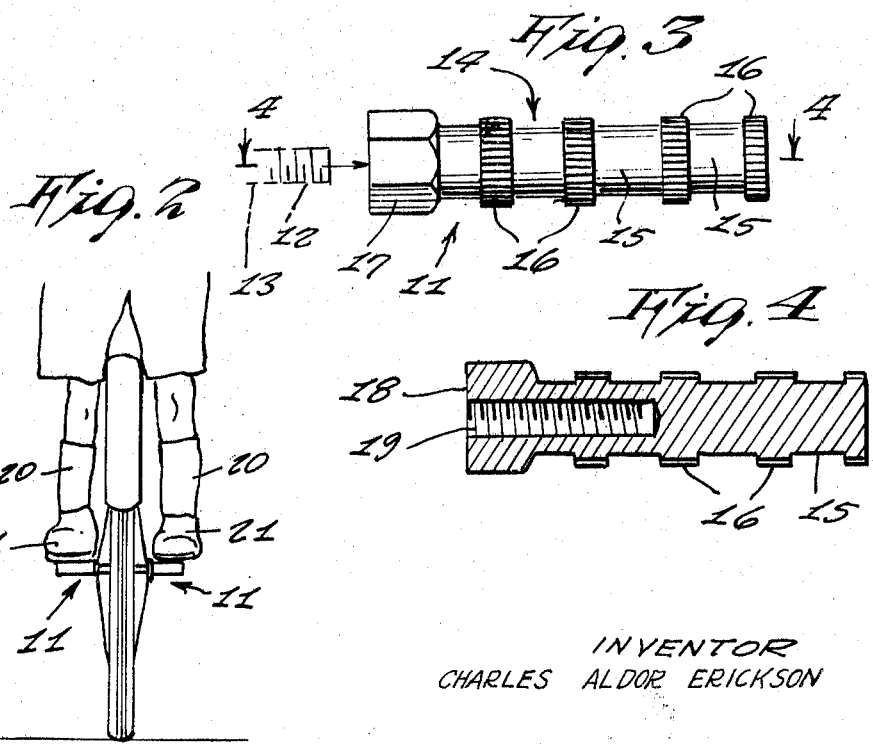
INVENTOR
CHARLES ALDOR ERICKSON

United States Patent Office 3,484,829
Patented Dec. 16, 1969

3,484,829
STANDING FIXTURE FOR BICYCLE PASSENGER
Charles Aldor Erickson, 10 S. 106 Clarendon Hills Road, Hinsdale, Ill. 60521
Filed Mar. 21, 1968, Ser. No. 715,048
Int. Cl. B62j 39/00, 25/00
U.S. Cl. 280—291                             1 Claim

ABSTRACT OF THE DISCLOSURE

A bicycle accessory comprising a pair of extensions threadingly securable upon the opposite ends of the rear wheel axle shaft, each of the extensions comprising a means upon which a passenger may stand with his feet, the passenger balancing himself by placing his hands upon the driver's shoulders.

---

This invention relates generally to bicycles. More specifically it relates to bicycle accessories.

It is generally well known that often a child or person desires to ride together with a driver upon a bicycle, however there is insufficient place for carrying a passenger. It is often seen that such a passenger will sit upon the bicycle frame directly in front of the driver however this is awkward for the driver in controlling the steering of the vehicle. Otherwise there is readily no other place where a passenger may be conveniently carried. This situation is of course in want of improvement.

Accordingly it is a principal object of the present invention to provide an accessory for a bicycle which will permit a passenger to be conveniently transported at the rear of a driver.

Another object of the present invention is to provide a bicycle accessory which comprises a pair of standing fixtures which are readily securable to the ends of the rear wheel axle shaft so to provide a standing room for a person's feet, the passenger supporting himself in standing position upon the extensions by placing his hands upon the driver's shoulders.

Another object of the present invention is to provide a standing fixture for bicycle passengers which is comprised of a pair of extensions which are readily removable from the bicycle rear wheel axle shaft when not needed and which may be conveniently carried in a person's pocket or placed within a tool pouch such as is carried upon many bicycles.

Other objects of the present invention are to provide a standing fixture for bicycle passengers which is simple in design, inexpensive to manufacture, rugged in construction, easy to use and efficient in operation.

These and other objects will be readily evident upon a study of the following specification and the accompanying drawing wherein:

FIGURE 1 is a side elevation view of a bicycle showing the present invention incorporated therein;

FIGURE 2 is rear elevation view thereof;

FIGURE 3 is an enlarged side elevation view of one of the elements comprising the present invention; and FIGURE 4 is a cross-sectional view taken on the lines 4—4 of FIGURE 3.

Referring now to the drawing in detail, the reference numeral 10 represents a standing fixture for bicycle passengers according to the present invention wherein there are a pair of extensions 11 each of which is removable securable upon the threaded ends 12 of a rear wheel axle shaft 13.

Each of the extensions 11 comprises an elongated bar or rod made of hard metal such as steel, brass or the like, the bar including a generally cylindrical shank 14 having a cylindrical side 15 with a plurality of spaced apart, circular portions 16 of slightly increased diameters. At one end of the shank there is an enlarged hexagonal portion 17 for the purpose of being readily received within the jaws of a conventional wrench, the hexagonal portion 17 being adjacent an end 18 having a central opening 19 extending therewithin, the opening 19 being internally threaded so as to threadingly engage the threads 12 of the axle shaft 13.

Preferably the length of the bar should be equivalent to an approximate width of an average passenger's foot or shoe.

In operative use, each extension 11 is threadingly engaged upon the threaded end of the axle shaft, and tightened by means of a wrench placed upon the hexagonal portion 17 thereof. A passenger may comprise a child, young person or other who may desire to ride together with a driver may then place his feet 20 upon the extensions as shown in FIG. 2 of the drawing. The knurled portions 16 will provide traction against the bottom of a shoe 21 so to prevent the passenger from readily falling off therefrom. In a riding position, the passenger may balance himself by placing his arms 22 upon the shoulders 23 of the driver, as shown in FIG. 1 of the drawing.

It is readily understood that the special configuration of the extension as illustrated in the drawing may be of course varied such as being of rectangular cross-sectional configuration so as to present a flat surface to the shoe bottom if so preferred. Other modified features may of course be likewise included.

I claim:
1. In a standing fixture for bicycle passengers, the combination of a pair of extensions, each of said extensions having self-contained means for being securable upon a bicycle, each of said extensions containing a means upon which a passenger may stand so to ride together with a driver upon said bicycle, each of said extensions including securement means for being secured upon one of the threaded ends at each end of a bicycle rear wheel axle shaft, each of said extensions comprising a longitudinally configurated bar made preferably from hard metal, said bar having a flat end wall at one end, said end wall having a threaded opening therein for threadingly engaging said threaded end of said rear wheel axle shaft, said bar being of cylindrical configuration having a cylindrical side bounded by said end walls and an opposite end wall, said cylindrical side wall including a plurality of knurled portions of relatively larger diameter than the remainder of said cylindrical side wall, said knurled portions comprising a means for frictionally engaging an underside of said passengers' shoes.

References Cited

UNITED STATES PATENTS

| | | | |
|---|---|---|---|
| 507,412 | 10/1893 | Broadbent | 280—291 X |
| 618,855 | 2/1899 | Ennis et al. | 280—291 X |
| 1,423,515 | 7/1922 | Catterall. | |

KENNETH H. BETTS, Primary Examiner